United States Patent

[11] 3,632,352

[72] Inventors Karl-Hans Muller
 Grossauheim;
 Gottfried Kallrath, Bruehl-Vochem, both of Germany
[21] Appl. No. 881,611
[22] Filed Dec. 2, 1969
[45] Patented Jan. 4, 1972
[73] Assignee Deutsche Gold-Und Silber-Scheideanstalt Vormals Roessler
 Frankfurt am Main, Germany
[32] Priority Dec. 3, 1968
[33] Germany
[31] P 18 12 350.7

[54] ANIMAL FEED COMPOSITION INCLUDING MILK EXCHANGE MATERIAL
 7 Claims, No Drawings
[52] U.S. Cl. .................................................. 99/2, 99/19, 99/56, 99/200
[51] Int. Cl. ....................................................... A23k 1/00, A23c 9/00

[50] Field of Search........................................... 99/2, 15, 19, 20, 56, 203, 202, 201, 200, 21, 143, DIG. 4

[56] References Cited
UNITED STATES PATENTS
| | | | |
|---|---|---|---|
| 2,113,216 | 4/1938 | Mitchell ...................... | 99/15 UX |
| 2,703,285 | 3/1955 | Luther.......................... | 99/2 |
| 2,995,447 | 8/1961 | Cipolla et al.................. | 99/19 |

Primary Examiner—Norman Yudkoff
Assistant Examiner—Hiram H. Bernstein
Attorney—Michael S. Striker ABSTRACT: An animal feed composition on the basis of a milk exchange material comprises, in addition to dry skimmed milk, animal and/or vegetable fats, emulsifying agent and nutrients an amount between 0.5 and 10 percent by weight relative to the total composition of a finely divided synthetic silicic acid.

The addition prevents caking of the composition and improves the flow properties.

ANIMAL FEED COMPOSITION INCLUDING MILK EXCHANGE MATERIAL

BACKGROUND OF THE INVENTION

The invention relates to an animal feed composition on the basis of a milk exchange material which comprises dry skimmed milk, vegetable and/or animal fats, emulsifying agents and nutrients and, if desired, antioxidants.

The raising and fattening of calves in present-day agriculture is more and more carried out with artificially made whole milk or by means of nutrients which contain milk fat exchange material. These products serve as substitutes for whole milk and are made from a preparation of dried skimmed milk (in powder form), inexpensive animal and vegetable fats and using additions of emulsifying agents and antioxidants. The resulting products, because of the high fat content of the milk exchange material and the low absorptive powers of the skimmed milk powder, have a tendency to cake. This is particularly conspicuous when the fats are subject to hardening at low temperatures.

SUMMARY OF THE INVENTION

The object of the invention invention is therefore to avoid these shortcomings of animal feed compositions which are made on the basis of milk exchange materials.

This is accomplished by including in the milk exchange material 0.5 to 10 percent by weight of a finely divided synthetic silicic acid in addition to the dried skimmed milk, the animal and/or vegetable fats, the emulsifying agent or agents, and the nutrients. The composition may also include antioxidants. The stated percentage relates to the weight of the total final product.

DESCRIPTION OF THE PREFERRED EMBODIMENTS

The silicic acid may be added to the final milk exchange composition or it may be added during the making of the product.

In addition to an improvement of the powdered milk exchange product, the silicic acid also effects a stabilizing of the emulsion which forms when water is stirred into the solid materials.

The term "silicic acid" as used herein is intended to include all active, finely divided either precipitated silicic acid formed in a wet process or pyrogenically obtained silicic acid.

The quality of the silicon dioxide employed is of material importance. It should be a powder with a primary particle size of less than 500 m$\mu$, preferably between 3 and 40 m$\mu$, and a surface between 50 and 500 m.$^2$/g., preferably 150–200 m.$^2$/g. measured by the BET method (the term BET is a conventional abbreviation for designating surface measurement according to the procedure described by Brunauer, Emmet and Teller, J. Amer. Chem. Soc. 60, p. 309 1938).

Preferred is a precipitation-formed, spray-dried highly dispersed silicic acid of superfine particle size having a BET surface between 50 and 300 m.$^2$/g. and particularly preferably with a surface between 200 and 250 m.$^2$/g. This is important because the formulations to which the present invention applies are of a high concentration, and the active agents in view of their physical properties imply very high requirements to be met by the carrier material. The significant features of the product of the invention must be a high absorptive property for liquids of all kinds, a good compatibility with almost all kinds of material, a physiological acceptability and good mixing properties with dry materials.

The term highly dispersed silicic acid designates the physical nature or state of a synthetically prepared silicic acid and is used in the conventional manner to designate a very finely divided free-flowing synthetically silicic acid.

In order to obtain maximum flow properties, it is preferred to use a precipitated silicic acid which has been reduced to a still lower particle size by an additional grinding operation. Secondary particle size for instance may be between 0.5 and 50$\mu$. This silicic acid is particularly suited as an agent for moistening up the composition because of its high pore volume and further to improve the storage stability at unusual climatic conditions.

It is also possible to use a pyrogenically obtained, highly dispersed silicic acid which should have a BET surface between 100 and 400 m.$^2$/g. and a primary particle size between 5 and 20 m$\mu$. Pyrogenically obtained highly dispersed silicic acid is prepared by hydrolytic treatment of a silicon halide for instance SiCl$_4$ in an oxyhydrogen flame.

The amount of silicic acid employed in the invention generally should be between 1 and 3 percent relative to the total volume of the feed composition. However, depending on the amount and consistency of the fat contents of the fodder, it is possible also to use smaller or larger amounts of the filler. In specific cases the amount may therefore be in the broad range between 0.5 and 10 percent.

The following example will further illustrate the invention.

EXAMPLE

Five grams of a wet-precipitate spray-dried silicic acid having a BET surface between 150 and 200 m.$^2$/g. and a primary particle size between 3 and 40 m$\mu$ was placed into a mixing vessel. During continuing mixing operation there were then added 495 g. of a milk exchange product as presently described, and the total composition was subjected to mixing for a period of 10 minutes. The milk exchange product comprised:
  60 percent dry skimmed milk (in powdered form)
  18 percent fat (beef fat, soy oil, palm oil and lecithin)
  10 percent dry sweet whey (powdered)
  5 percent of a finely powdered soy meal
  6 percent corn starch and
  1 percent balance.

There was thus obtained a free-flowing powder which had hardly any tendency for caking.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Animal feed composition on the basis of a milk exchange material comprising dry skimmed milk, animal or vegetable fats or both of these fats, emulsifiers, nutrients, and 0.5 to 10 percent by weight of a finely divided synthetic silicic acid, the said percentage being relative to the weight of the total composition.

2. The feed composition of claim 1, wherein the silicic acid is a wet-precipitated, highly dispersed silicic acid of superfine particle size having a BET surface between 50 and 500 m.$^2$/g. and a primary particle size below 500 m$\mu$.

3. The feed composition of claim 1, wherein the silicic acid is a wet-precipitated, spray-dried, highly dispersed silicic acid having a BET surface between 50 and 300 m.$^2$/g. and a secondary particle size between 0.5 and 50$\mu$.

4. A feed composition as defined in claim 1, wherein the silicic acid is a pyrogenically obtained, highly dispersed silicic acid having a BET surface between 100 and 400 m.$^2$/g. and a primary particle size between 5 and 20 m$\mu$.

5. A feed composition as defined in claim 1, which includes an antioxidant.

6. A feed composition as defined in claim 1 comprising
  1 percent of the entire composition of finely divided synthetic silicic acid
  60 percent dry skimmed milk (in powdered form)
  18 percent fat (beef fat, soy oil, palm oil and lecithin)
  10 percent dry sweet whey (powdered)
  5 percent of a finely powdered soy meal
  6 percent corn starch and
  1 percent balance.

7. A composition according to claim 1 in the form of an aqueous emulsion thereof.

* * * * *